July 12, 1932. F. DIETERLE 1,867,443
CASING AND BLADDER CONNECTER FOR FOOTBALLS, BASKETBALLS, AND THE LIKE
Filed Feb. 24, 1930
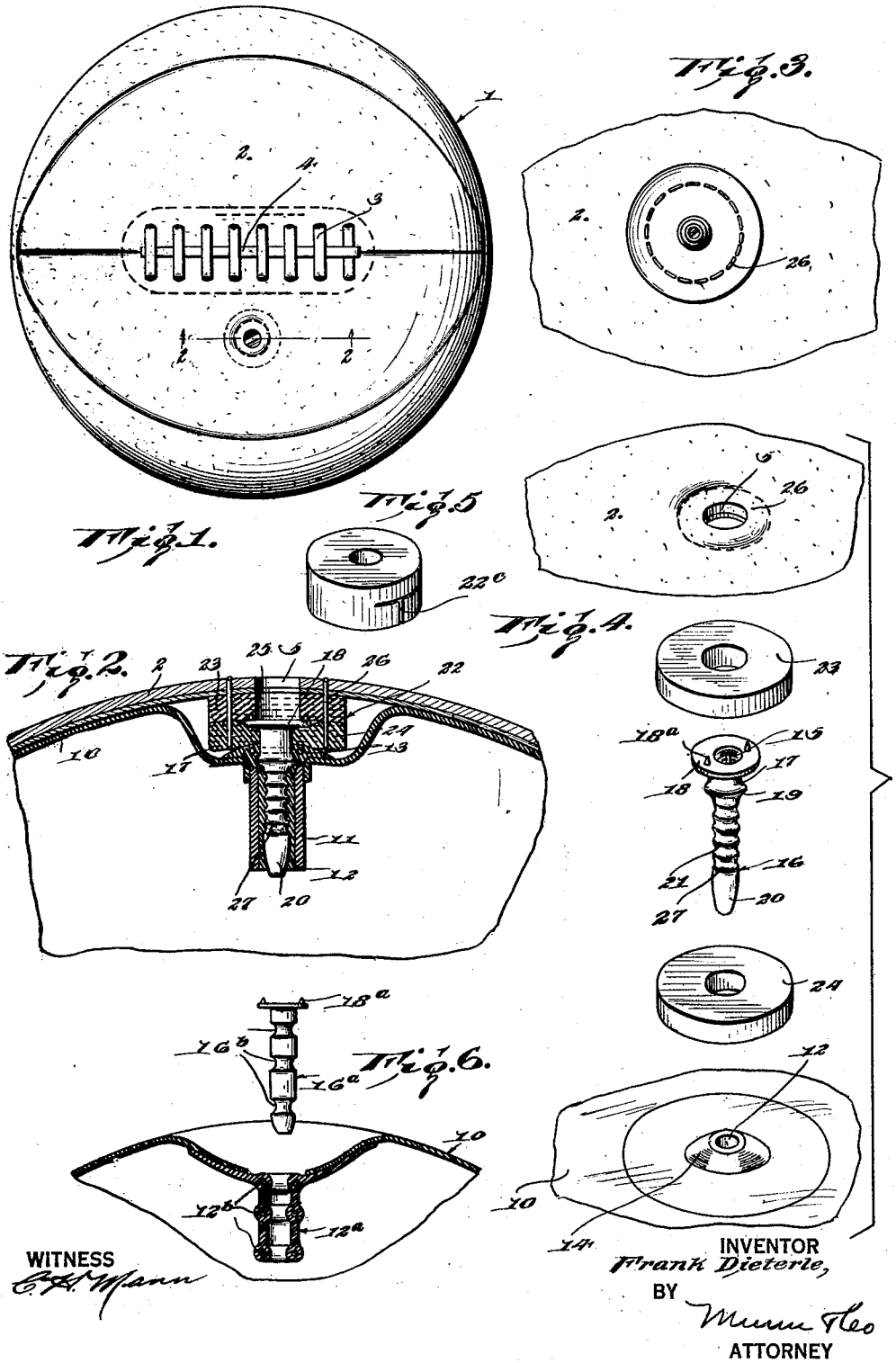
WITNESS
INVENTOR
Frank Dieterle,
BY
ATTORNEY Patented July 12, 1932

1,867,443

UNITED STATES PATENT OFFICE

FRANK DIETERLE, OF UTICA, NEW YORK

CASING AND BLADDER CONNECTER FOR FOOTBALLS, BASKETBALLS, AND THE LIKE

Application filed February 24, 1930. Serial No. 430,812.

This invention relates to the construction of basket balls, foot balls, striking bags, volley balls, socker balls, and other articles which require a bladder or like air pressure containers.

Foot balls and the like such as are now in use are of the type in which the bladder or encased air reservoir carries the inflating valve and its stem and they are so constructed that the bladder must be inserted through the slit or opening in the casing provided for that purpose. To locate the valve stem carrying screw plate and connect it with the cooperating casing carried member has to be accomplished by the sense of touch or feeling. The attaching of the two members must be by rotating either the cover or the operator's hand to connect the threads on the external upper portion of the bladder carried tube with the internal threaded portion of the casing carried plate. This is a difficult performance because of the space limit and working in the dark as it were merely by the sense of feeling. Moreover this connection of the bladder and the casing frequently results in the dropping back of the bladder into the casing during the attaching of the inflating pump owing to the rotary motion necessary for attaching the pump to the bladder carried valve stem, which often times unscrews the bladder carried stem from the casing carried plate. Furthermore, in this form of connection when a new bladder becomes necessary a new valve is also required because of the inseparability of the two.

It is to overcome the above pointed out objectionable features that this invention was designed and a primary object thereof is to provide a connecter for detachably uniting a compressed air reservoir or container with a casing or housing in air tight relation without employing any metal plates with or without screw threads or any springs or the like, and whereby the check valve is retained and again used when the reservoir is replaced.

Another object is to so construct such a connecter that the connection may be made in full view of the operator and in which all possibility of the bladder dropping back into the casing is eliminated.

Another object is to provide and so construct a bladder and its casing that shifting of the alined inflating apertures in the bladder and the casing is eliminated.

Still another object of the invention is to so construct the bladder that the inflating thereof will operate to effect a seal or air tight connection between it and the casing.

In carrying out these objects, the invention is susceptible of a wide range of modification without departing from the spirit or sacrificing any of the advantages of the claimed invention; there being shown in the drawing for illustrative purposes a preferred and practical form, in which:

Figure 1 represents a plan view of a foot ball embodying this invention;

Fig. 2 is a detail sectional view taken on the line 2—2 of Fig. 1;

Fig. 3 is a plan view on an enlarged scale of a portion of the foot ball showing the mounting of the valve; and Fig. 4 is a perspective view showing the various parts of the invention arranged in juxtaposition ready for assembling;

Fig. 5 is a detail perspective view of a slightly different form of stem carrying block; and Fig. 6 is a detail sectional view of a portion of a bladder with the stem shown ready for insertion and illustrating a slight modification.

In the embodiment illustrated a foot ball 1 of ordinary construction is shown having the usual outer casing or cover 2 and the inflating bladder or reservoir 10 arranged therein and which is designed to be secured in operative position by means of a lacing 3 for closing the slit 4 in the casing through which the bladder is designed to be inserted.

The bladder 10 is of special construction as well as its valve connection with the casing 2 both of which constitute this invention. Around the valve stem receiving opening in the bladder is an indentation or depression 10a which provides surplus rubber so that when the bladder is inflated the inflation of this surplus rubber will have a tendency to force the connecters into engaging position.

The bladder 10 has the usual soft rubber tube or sleeve 11 mounted in an opening in the bladder and which in the ordinary construction carries a central valve stem similar to that used in pneumatic tires and which constitutes an integral part of the bladder. This invention contemplates removing this metal valve stem from the bladder and inserting in the rubber sleeve 11 an inner sleeve 12 of soft rubber or similar material which is capable of having embedded in the wall thereof projections on a valve stem carried by the casing as will be presently more fully described.

While the soft rubber inner sleeve 12 is shown as a separate member from the outer sleeve 11 obviously they may be made as one and at the upper end of sleeve 12 is a valve stem gripping member 13 in the form of a rubber ring or rib having a reinforcing spring wire embedded therein and vulcanized permanently to the bladder at the mouth of the stem receiving opening in said bladder. This stem gripping member 13 which may be termed a super-retainer is held against stretching away from the stem during the process of inflation by means of a non-stretchable reinforcing collar 14 arranged around the bladder opening.

The connecter for uniting the casing 2 with the bladder 10 and which also carries the inflation valve indicated at 15 in Fig. 4, comprises a tubular stem 16 composed of hard rubber, fiber, bakelite, metal, or any suitable material which is provided at its upper end with a head 17 having an annular flange 18 at its outer end and a rib 19 at its inner end. The end of the stem 16 is tapered as shown at 20 to facilitate its insertion in the sleeve 11 carried by the bladder. Between the tapered end 20 and the rib 19 the body portion of the sleeve or stem 16 is equipped with knurling or with lateral projections here shown in the form of annular ribs 21 which are designed to be embedded in the inner sleeve 12 of the bladder carried member 11 and interlockingly engaged therewith to prevent rotation of the valve stem within said member 11.

The flanged head of the valve stem 16 is designed to be attached to the inner face of the casing 2 and have the opening in said stem arranged opposite the opening 5 in said casing, by means of a bed or connecting block 22 which may be of any desired configuration being here shown annular and composed of rubber reinforced with a non-stretchable material. This bed 22 as illustrated in Figs. 2 and 4 is composed of two sections 23 and 24 and between which the flange 18 of the valve stem head is designed to be held as is shown clearly in Fig. 2, said flange being provided with teeth 18a designed to bite into bed 22 and hold the stem against turning relatively to the bed. Between the two members 23 and 24 at the inner edge thereof is formed a groove 25 to receive the flange 18 of the valve stem and by means of this connection the said flange is held out of contact with the inner wall of the casing 2 by means of the member 23. This bed 22 is shown connected with the casing 2 by means of stitching 26. It will thus be seen that this connecter member carried by the casing comprises an attaching unit composed of two parts, one of which is the bed 22 and the other the stem 16.

In Fig. 5 the bed 22a is made in one piece with a slit 22c for the insertion of the stem and when the bed or block is sewed to the casing the slit will be entirely closed.

The tapered end 20 at its junction with the body of the stem 16 has a decided shoulder 27 which facilitates the engagement of the stem with the member 12 and avoids all possibility of its being accidentally separated.

It is to be understood that the tubular member composed of the sections 11 and 12 may be constructed of any suitable material which will provide for expansion and contraction and which has a bore extending throughout its length to receive the stem 16 it being of course understood that this bore is made proportionately smaller than the stem to insure the interlocking engagement of the two, the projections 21 of the stem being embedded in the member 12.

From the above description it will be obvious that the bladder 10 and the valve stem 16 are separate and distinct units, the valve stem being permanently united with the casing of the ball so that when replacing of the bladder becomes necessary the rubber bladder or reservoir is the only portion to be discarded, the valve remaining intact on the casing and serving for use in connection with several bladders.

In the form shown in Fig. 6 the valve stem 16a has three grooves 16b, one at each end and one in the middle. The bladder carried tube 12a of this form has three ribs or rings 12b positioned to interlockingly engage the grooves 16b of the valve stem when the parts are assembled.

In connecting a bladder with the casing as shown in the accompanying drawing the valve stem 16 on the inside of the casing may be pushed up through the opening or slit before the bladder has been inserted through the slit and the stem may be easily inserted in the bladder opening without any turning or rotating of the parts relatively to each other. The bladder is then pushed into the casing through the slit therein. The insertion of the stem within the bladder carried member 12 is facilitated by moistening the stem either with saliva, shellac, rubber cement, or any suitable fluid which will serve to assist in sliding of the stem into the bladder member. After the stem has been fully inserted the super-retaining metal reinforced rubber ring 13 which is carried by the bladder will seat itself in the groove on the upper portion of the stem and thus not only provides a positive seal between the parts, but prevents all possibility of the bladder dropping back into the casing. In those heretofore in use the cause of the bladder dropping back into the casing has been due to the fact that the inflating pump is attached directly to the bladder and the rotary motion incident to such attaching operates to release the threads on the stem of the bladder from contact with the threaded portion on the casing. In this invention this defect is overcome owing to the fact that the valve stem is carried by the casing permanently and hence the application of the pump thereto will not in any way affect the connection of the bladder and the casing.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

I claim:

The combination with a compressed air container having an opening with an expansible and contractible tube secured around said opening and depending into said container, a casing for encompassing said container having an opening to register with the container opening, a bed surrounding said opening and fixed to the inner face of the casing and composed of superposed sections with a groove between them adjacent the openings therein to form a flange seat, a tubular valve stem having an annular flange at its outer end to fit in said seat, and a rib spaced inward from said flange, said contractible tube having means for gripping the valve stem between its flange and rib to hold the parts yieldably yet securely engaged being separable by a pull exerted on one of the members, said flange having prongs on its outer face to engage the bed and hold the tube against turning.

FRANK DIETERLE.